United States Patent [19]

Aihara

[11] Patent Number: 5,337,556
[45] Date of Patent: Aug. 16, 1994

[54] DETECTING DEVICE AND METHOD FOR ENGINE CATALYST DETERIORATION

[75] Inventor: Masaaki Aihara, Musashino, Japan

[73] Assignee: Fuji Jukogyo Kabushiki Kaisha, Tokyo, Japan

[21] Appl. No.: 19,310

[22] Filed: Feb. 18, 1993

[30] Foreign Application Priority Data

Mar. 30, 1992 [JP] Japan .................................. 4-074214

[51] Int. Cl.$^5$ .................................................. F01N 3/00
[52] U.S. Cl. ........................................... 60/276; 60/274; 60/277
[58] Field of Search .......................... 60/274, 276, 277; 123/691

[56] References Cited

U.S. PATENT DOCUMENTS 5,119,628  6/1992  Uema et al. ........................... 60/277

Primary Examiner—Noah P. Kamen
Attorney, Agent, or Firm—Beveridge, DeGrandi, Weilacher & Young

[57] ABSTRACT

In a detecting method for deterioration of a catalyst inserted in an exhaust pipe, first, counting the number of times to cut the predetermined slice levels set in accordance with the engine operating conditions by $O_2$-sensors provided at the front and rear portions of the catalyst respectively. Then, a ratio of the counted numbers is calculated to judge a deterioration of a catalyst of a catalytic converter. Thus, influence of an output amplitude fluctuation of the $RO_2$ sensor varying according to the operating condition is avoided to prevent a misjudgement of the deterioration of the catalyst.

2 Claims, 10 Drawing Sheets

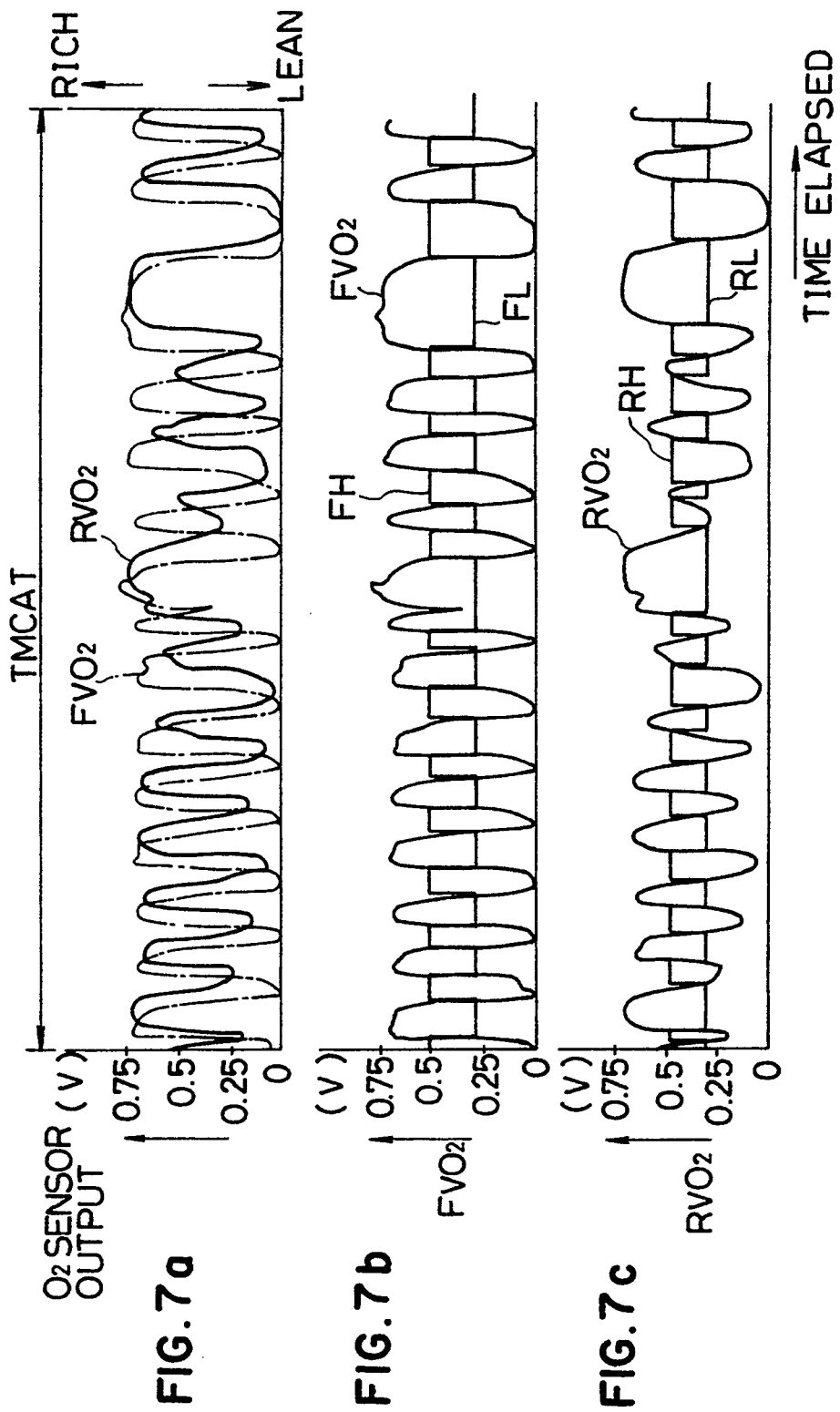

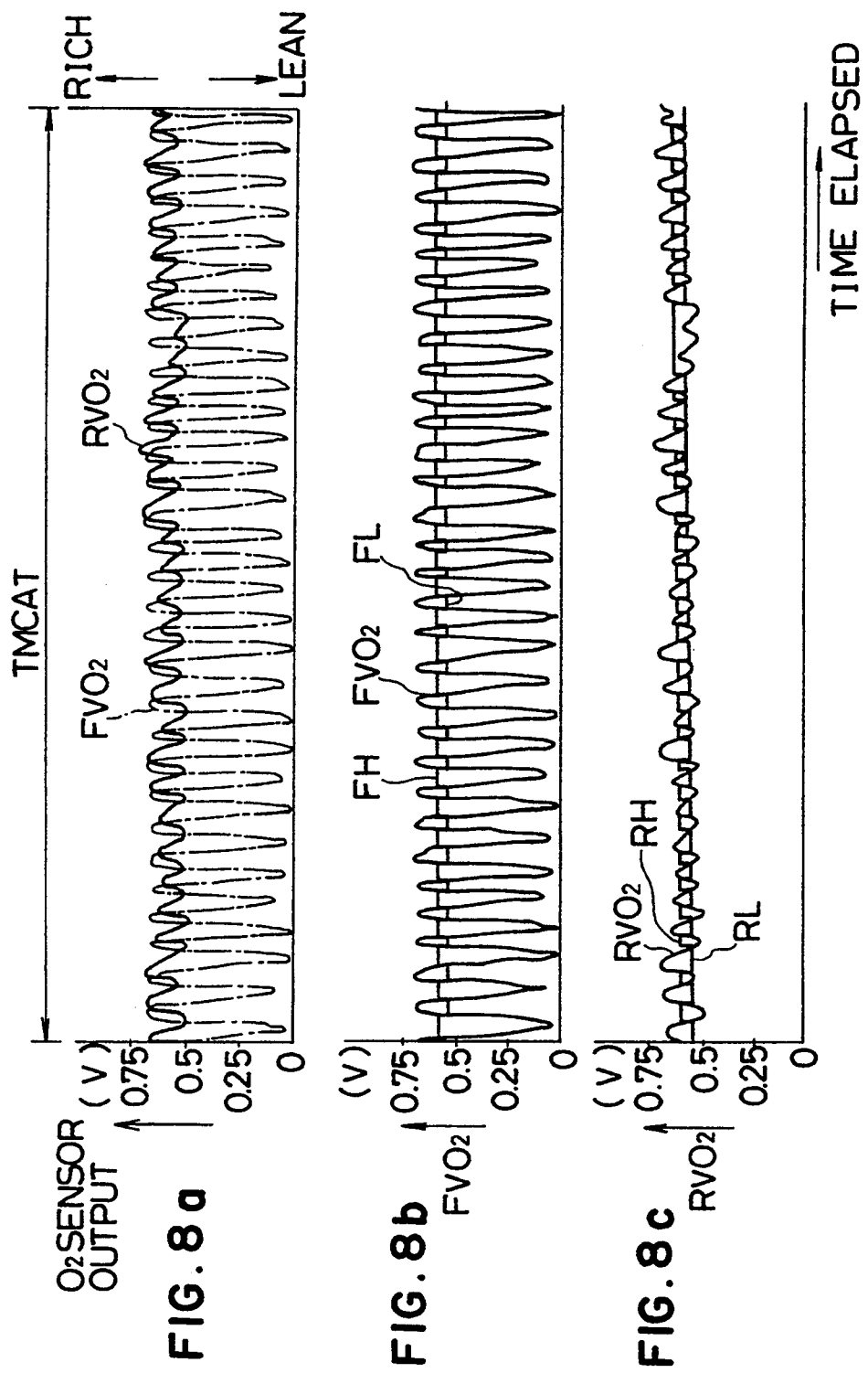

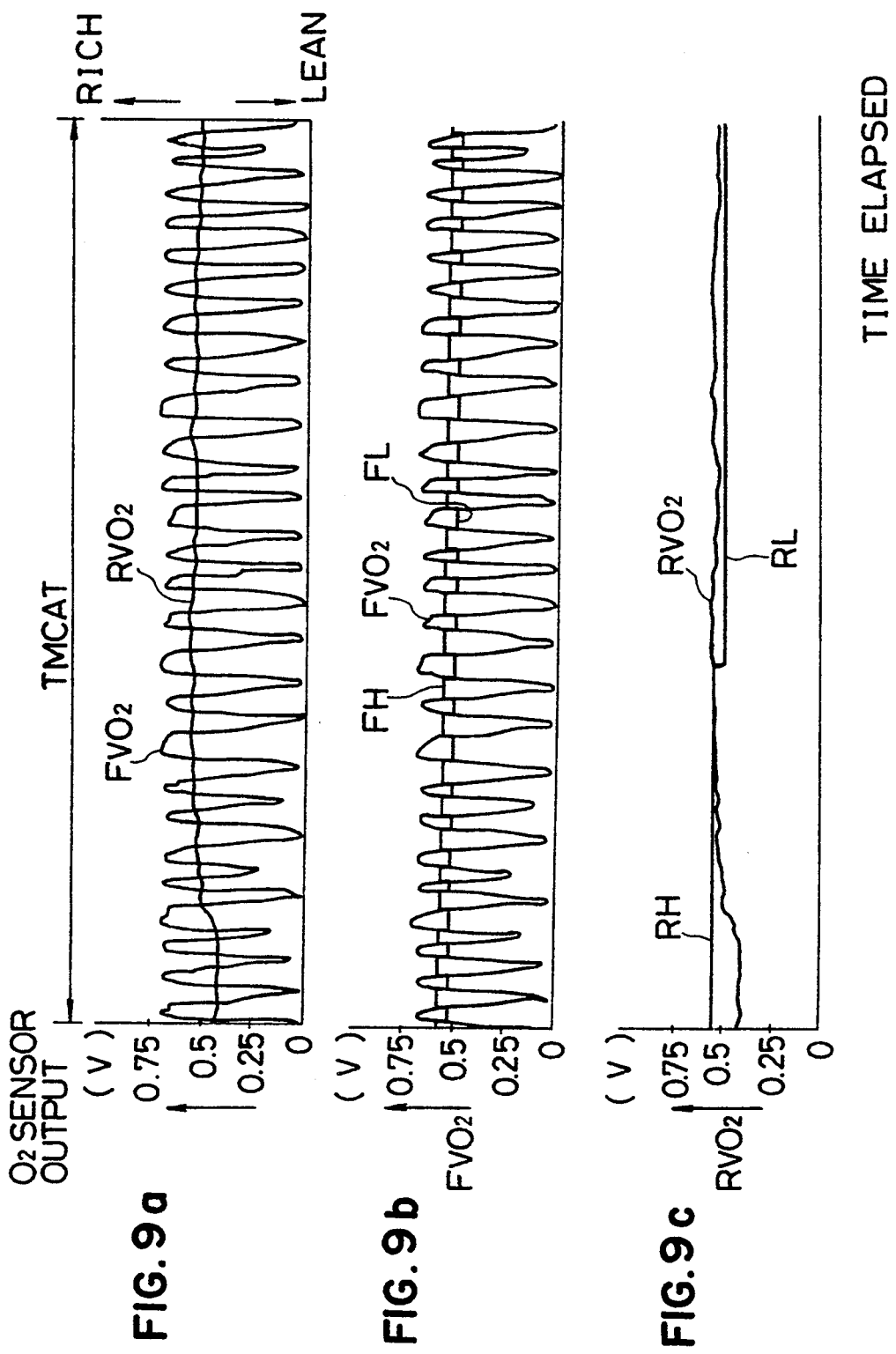

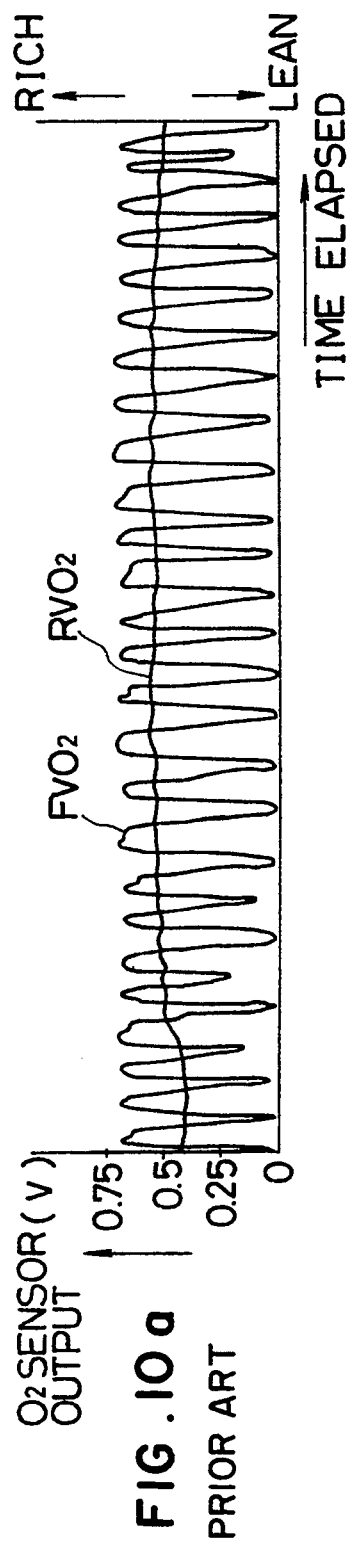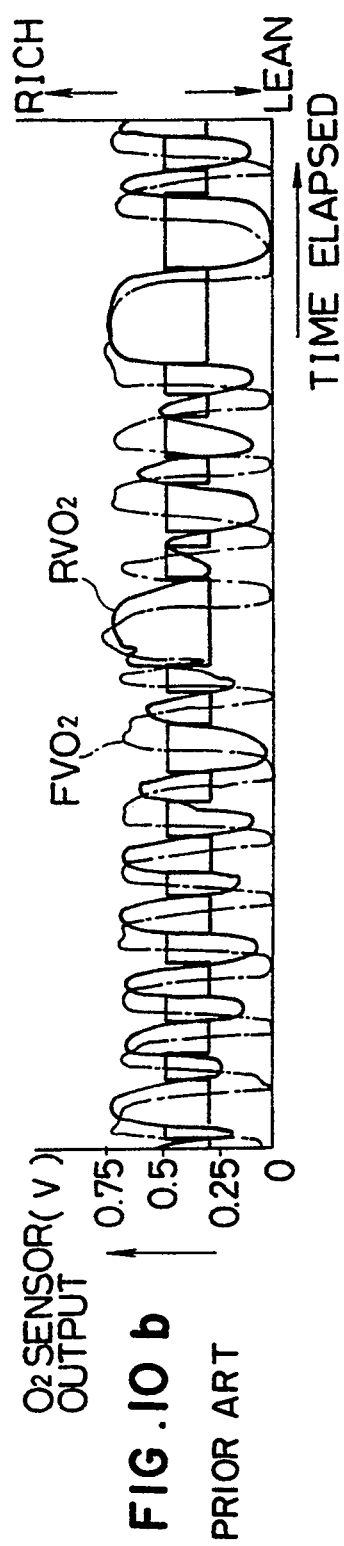

DETECTING DEVICE AND METHOD FOR ENGINE CATALYST DETERIORATION

BACKGROUND OF THE INVENTION

The present invention relates to a device for detecting a deterioration of a catalyst mounted on an engine to detect the deterioration by two air-fuel ratio sensors provided upstream and downstream sides of a catalytic converter and a method therefor.

Recently, in the feedback control of an air-fuel ratio of an engine, a double $O_2$ sensor system where air-fuel ratio sensors such as $O_2$ sensors are provided upstream and downstream sides of a catalytic converter for purifying exhaust gas of the engine so that an irregularity of output characteristics of the first $O_2$ sensor of the upstream side is compensated by the second $O_2$ sensor of the downstream side to improve a decrease of a controlling accuracy due to the irregularity of the output characteristics of a single $O_2$ sensor has been proposed.

In the double $O_2$ sensor system, a deterioration of a catalyst is detected by comparing the output characteristics of the two $O_2$ sensors. For example, Japanese Utility Model Application Laid-Open 63-128221 discloses a technique for determining a deterioration of a catalyst based upon a ratio of inverting frequencies (or periods) of outputs of first and second air-fuel ratio sensors provided upstream and downstream sides of a catalytic converter.

In general, purifying performance of a catalyst has a strong correlation with a storage effect of oxygen contained in the catalyst. As shown in FIG. 10($a$), the catalyst before a deterioration has a preferable storage effect of oxygen, and an output $FVO_2$ of a first $O_2$ sensor upstream side of a catalytic converter is deflected toward rich and lean with time elapsed by means of an air-fuel ratio feedback correction, whereas an output $RVO_2$ of a second $O_2$ sensor downstream side of the catalytic converter is substantially constant, but if the catalyst is deteriorated, its storage effect is deteriorated, and, as shown in FIG. 10($b$), the output $RVO_2$ of the second $O_2$ sensor downstream side of the converter is deflected toward rich and lean with time elapsed at a predetermined delay from the output $FVO_2$ of the first $O_2$ sensor upstream side of the converter.

More particularly, when the catalyst is deteriorated, the output characteristics of the second $O_2$ sensor downstream side of the catalytic converter approach those of the first $O_2$ sensor upstream side of the converter. Thus, a difference of inverting frequencies of both the first and second $O_2$ sensors is reduced and hence a deterioration of the catalyst can be decided by comparing a ratio of the inverting frequencies of both the first and second $O_2$ sensors with a set value.

In this connection, the inverting frequencies of the outputs of the first and second $O_2$ sensors provided upstream and downstream sides of the catalytic converter can be calculated from the number of times of being cut or crossed by the outputs of the first and second $O_2$ sensors across upper and lower slice levels provided at the first and second $O_2$ sensors within a predetermined time. As the upper and lower slice levels of the first and second $O_2$ sensors, predetermined constant values unitarily defined previously as shown in FIGS. 9($a$) to 9($c$), are normally used.

However, when a temperature of exhaust gas of an engine is varied with a variation of operating conditions of the engine such as an engine speed and a vehicle speed even if a load state of the engine such as a basic fuel injection quantity and the like is the same as that after or before the catalyst is deteriorated, the output amplitude of the second $O_2$ sensor downstream side of the catalytic converter is remarkably changed in case where the catalyst is deteriorated.

Accordingly, the inverting frequencies of the outputs of the first and second $O_2$ sensors are varied in dependency on the operating condition of the engine, and when a vehicle is traveled, for example, at a high speed in which the engine of the vehicle rotates at a high speed and a temperature of exhaust gas of the engine rises, the amplitude of the output $RVO_2$ of the second $O_2$ sensor is reduced, as shown in FIG. 11, Thus, if the unitarily defined constant slice levels are employed, the output $RVO_2$ of the second $O_2$ sensor does not cut the slice level of the $O_2$ sensor even if the amplitude of the output $RVO_2$ of the second $O_2$ sensor is produced due to a deterioration of the catalyst. Then, a difference of the inverting frequency of the output of the first $O_2$ sensor upstream side of the catalytic converter and the inverting frequency of the output of the second $O_2$ sensor downstream side of the converter is increased. Hence even if the catalyst is deteriorated, the catalyst is judged to be normal, and an erroneous decision occurs in the case of diagnosing a deterioration of the catalyst.

SUMMARY OF THE INVENTION

An object of the present invention is to provide a device for detecting a deterioration of a catalyst mounted on an engine where influence of an amplitude of an output of an air-fuel ratio sensors, varying in dependency on operating conditions of the engine is avoided to prevent an erroneous decision in the case of diagnosing a deterioration of the catalyst.

In order to achieve the afore-described object according to a first aspect of the present invention, there is provided a device for detecting a deterioration of a catalyst mounted on an engine having, a first air-fuel ratio sensor inserted at a front portion of said catalyst in an exhaust pipe for detecting a first air-fuel ratio before exhaust gases enter said catalyst, a second air-fuel ratio sensor inserted at a rear portion of said catalyst in said exhaust pipe for detecting a second air-fuel ratio after said exhaust gases pass through said catalyst, and various sensors for detecting an engine operating condition and for generating an engine operating condition signal, an improvement of the device which comprises first setting means responsive to said engine operating condition signal for deciding a first slice level of said first air-fuel ratio sensor in accordance with each engine operating condition and for producing a first number signal of being cut by an output of said first air-fuel ratio sensor; second setting means responsive to said engine operating condition signal for deciding a second slice level of said second air-fuel ratio sensor in accordance with each engine operating condition and for producing a second number signal of being cut by said output of said second air-fuel ratio sensor; and judging means responsive to said first and second number signals for precisely deciding a deterioration of said catalyst by calculating a ratio between both signals so as to avoid a misjudgement of said deterioration and to eliminate an amplitude output disturbance from said second air-fuel ratio sensor due to a fluctuation of said engine operating condition.

Another object of the present invention is to provide a method for detecting a deterioration of a catalyst mounted on an engine where a misjudgement of a deterioration of the catalyst is avoided and an amplitude output disturbance from a second air-fuel ratio sensor due to a fluctuation of an engine operating condition is eliminated.

In order to further achieve the afore-described another object according to a second aspect of the present invention, there is provided a method for detecting a deterioration of a catalyst mounted on an engine having, a first air-fuel ratio sensor inserted at a front portion of said catalyst in an exhaust pipe for detecting a first air-fuel ratio before exhaust gases enter said catalyst, a second air-fuel ratio sensor inserted at a rear portion of said catalyst in said exhaust pipe for detecting a second air-fuel ratio after said exhaust gases pass through said catalyst, and various sensors for detecting an engine operating condition and for generating an engine operating condition signal, an improvement of the method which comprises the steps of setting a first slice level of said first air-fuel ratio sensor in accordance with each engine operating condition; producing a first number signal of being cut by an output of said first air-fuel ratio sensor; deciding a second slice level of said second air-fuel ratio sensor in accordance with each engine operating condition; generating a second number signal of being cut by said output of said second air-fuel ratio sensor; and judging a deterioration of said catalyst by calculating a ratio between said both signals so as to avoid a misjudgement of said deterioration and to eliminate an amplitude output disturbance from said second air-fuel ratio sensor due to a fluctuation of said engine operating condition.

According to the device and method for detecting a deterioration of the catalyst mounted on the engine in accordance with the present invention, the first slice level of the output of the first air-fuel ratio sensor upstream side of the catalytic converter and the second slice level of the output of the second air-fuel ratio sensor downstream side of the converter are respectively set based on the operating condition parameters of the engine. Thus, the deterioration of the catalyst is determined based upon a ratio of the number of times of being cut by the output of the first air-fuel ratio sensor across the first slice level to that of the output of the second air-fuel ratio sensor across the second slice level.

These and other objects and features of the present invention will become understood from the following description with reference to the accompanying drawings.

BRIEF DESCRIPTION OF THE DRAWINGS

FIGS. 7(a), 7(b) and 7(b) are timecharts showing the relationship between output characteristics of an $O_2$ sensor and a slice level with time elapsed when the catalyst is deteriorated;

FIGS. 8(a) to 8(c) are timecharts showing the relationship between output characteristics of an $O_2$ sensor and a slice level with time elapsed at the time of a high exhaust gas temperature when the catalyst is deteriorated;

FIGS. 9(a) to 9(c) are timecharts showing the relationship between output characteristics of an $O_2$ sensor and a slice level when the catalyst is normal;

FIG. 10(a) is a timechart showing output characteristics of an $O_2$ sensor when a catalyst is normal in a prior art;

FIG. 10(b) is a timechart showing the relationship between output characteristics of the $O_2$ sensor and a slice level in the prior art when the catalyst is deteriorated.

DETAILED DESCRIPTION OF THE PREFERRED EMBODIMENTS

The embodiments of the present invention will be explained with reference to accompanying drawings.

Embodiments of the present invention are shown in FIG. 1 to 9.

Figure 5:
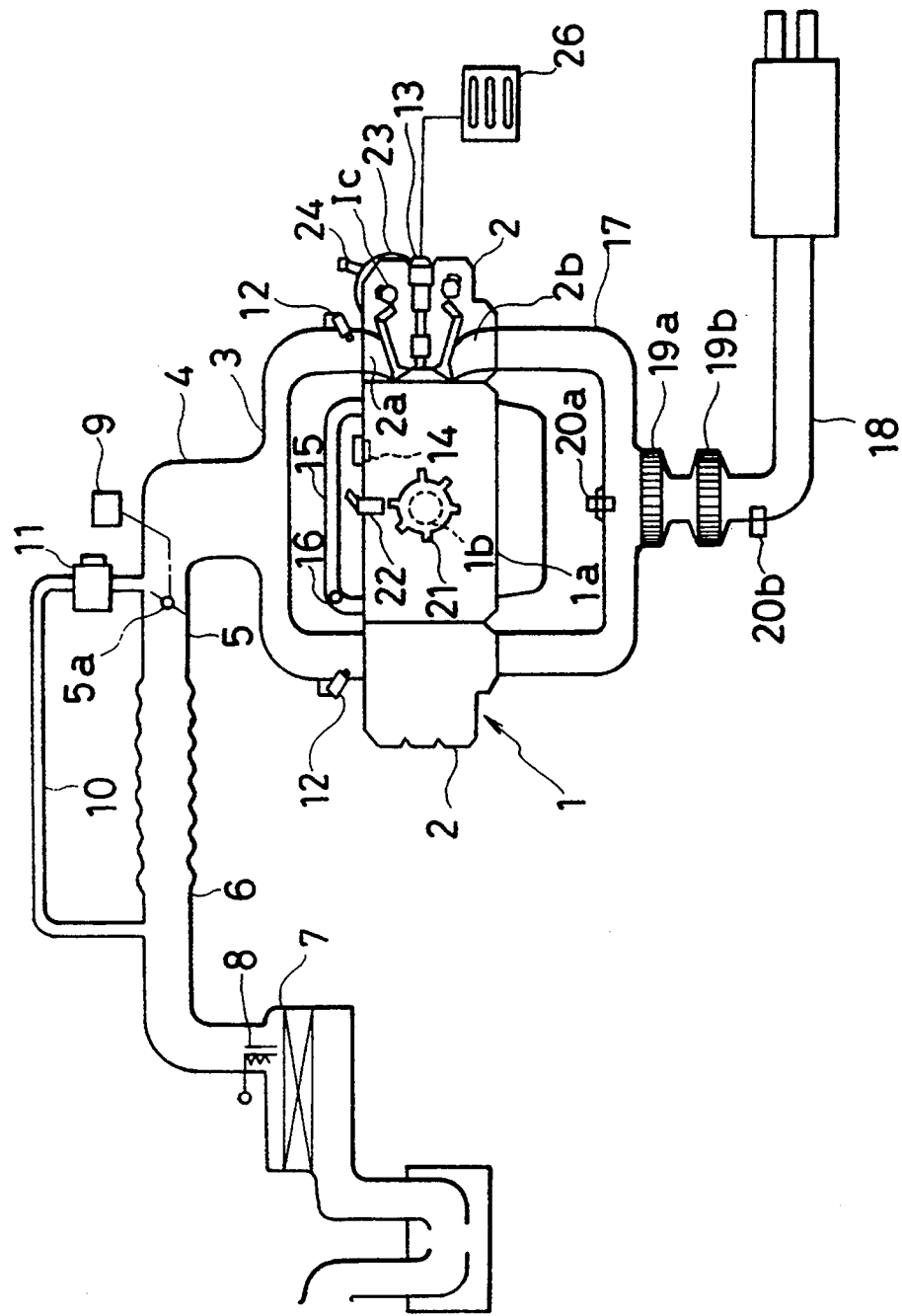
FIG. 5 is a schematic view of an overall arrangement of an engine control system in which the present invention is applied.

In FIG. 5, showing an entire engine control system of executing the present invention, numeral 1 indicates an engine body (a horizontal opposed type engine in FIG. 5). An intake manifold 3 is connected to an intake port 2a formed in a cylinder head 2 of the engine body 1. Further, a throttle chamber 5 is connected to an upstream side of the intake manifold 3 through an air chamber 4. And, an air cleaner 7 is mounted at an upstream side of the throttle chamber 5 through an intake pipe 6.

An intake air sensor 8 made of a hot wire or a hot film mounted directly downstream side of the air cleaner 7 of the intake pipe 6, and a throttle sensor 9 is connected to a throttle valve 5a provided in the throttle chamber 5.

An idle speed control valve (hereinafter abbreviated as to "an ISCV") 11 is mounted in a bypass passage 10 for communicating an upstream side with a downstream side of the throttle valve 5a. An injector 12 is arranged directly upstream side of the intake port 2a of each cylinder of the intake manifold 3. A spark plug 13 exposed at its end within a combustion chamber of the engine, is mounted in each cylinder of the cylinder head 2, and an ignitor 26 is connected to the spark plug 13.

A knock sensor 14 is mounted on a cylinder block 1a of the engine body 1. A coolant temperature sensor 16 is disposed in a coolant passage 15 formed in the cylinder block 1a. Further, an exhaust pipe 18 is connected to an assembly of exhaust manifolds 17 connected to exhaust ports 2b of the cylinder head 2.

A catalytic converter 19 is mounted at the assembly of the exhaust manifolds 17. A front $O_2$ sensor (hereinafter referred to as "an $FO_2$ sensor") 20a is disposed as a first air-fuel ratio sensor upstream side of the catalytic converter 19, and a rear $O_2$ sensor (hereinafter referred to as "an RO$_2$ sensor") 20b are disposed as a second air-fuel ratio sensor downstream side of the converter 19.

A crank rotor 21 is journaled at a crank shaft 1b supported to the cylinder block 1a. A crank angle sensor 22 made, for example, of an electromagnetic pickup or the like, is opposed to an outer periphery of the crank rotor 21. Further, a cam angle sensor 24 made, for example, of an electromagnetic pickup or the like, is opposed to a cam rotor 23 connected to a cam shaft 1c of the cylinder head 2.

In the engine control system, an engine control unit (hereinafter referred to as "an ECU") 31 to be described in detail later, is provided to calculate an engine speed NE based on a signal from the crank angle sensor 22 when the crank angle sensor 22 detects a protrusion or a slit formed on an outer periphery of the crank rotor 21 at each predetermined crank angle, and to set a fuel injection quantity, an ignition timing, etc. Further, the ECU 31 judges a cylinder operating during a combustion stroke in dependency on a signal from the cam angle sensor 24 when the cam angle sensor 24 detects a protrusion or a slit formed on the outer periphery of the cam rotor 23.

It is noted that the above-described crank angle sensor 22 and the cam angle sensor 24 are not limited to the electromagnetic pickups. For example, the crank angle sensor 22 and the cam angle sensor 24 may be optical sensors.

Figure 6:
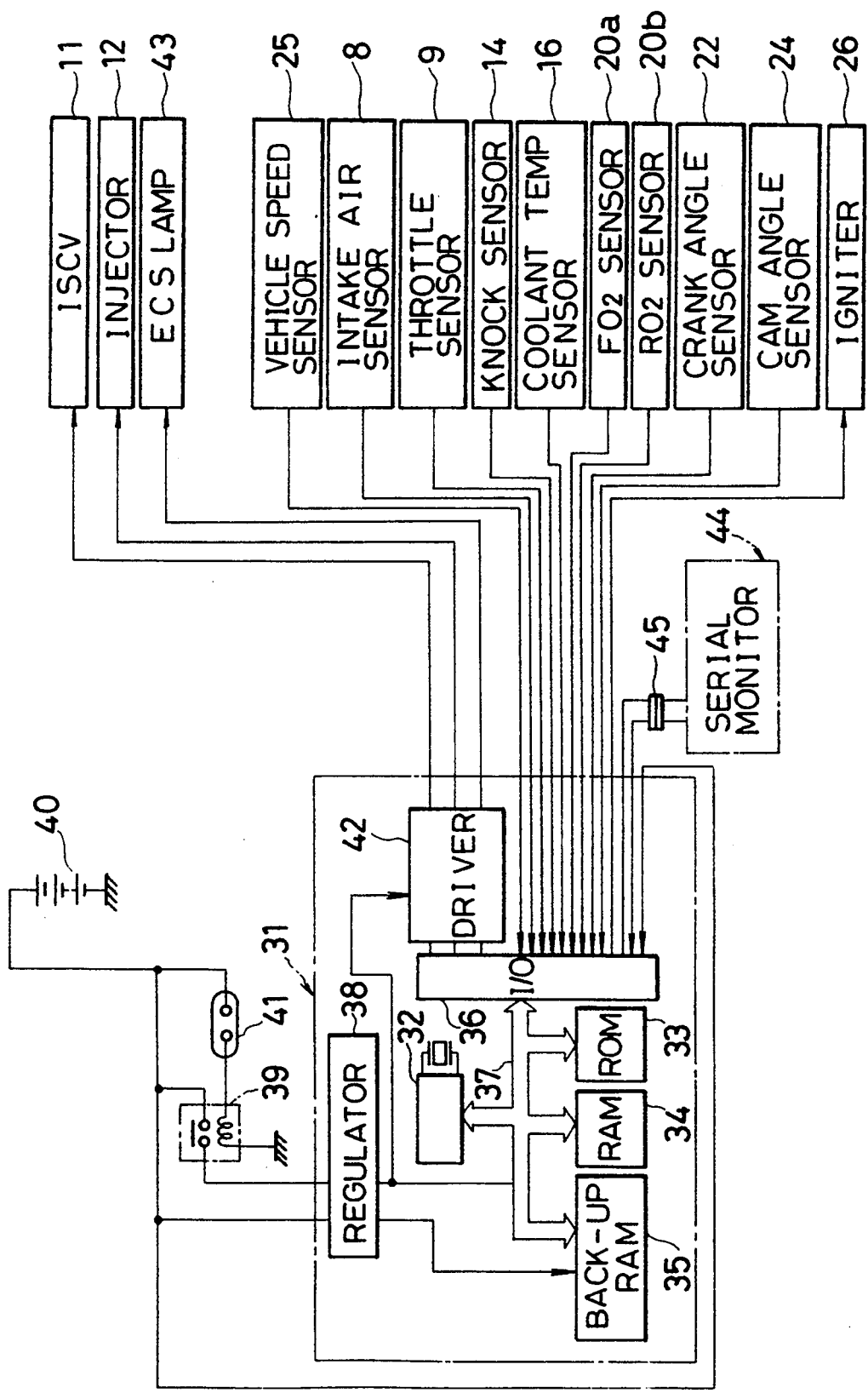
FIG. 6 is a circuit diagram of an arrangement of an electronic control system in which the present invention is applied.
Figure 11:
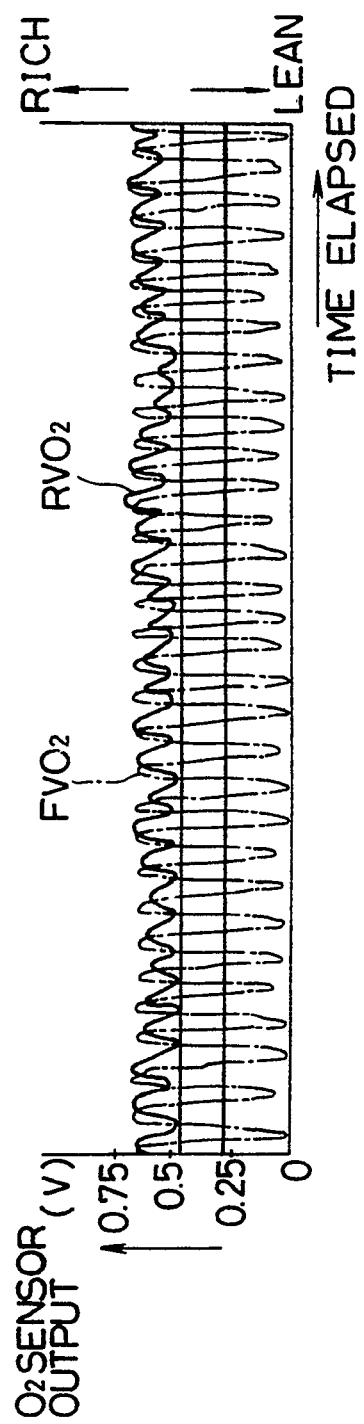
FIG. 11 is a timechart showing the relationship between output characteristics of the $O_2$ sensor and the slice level in the prior art when the catalyst is deteriorated.

Referring to FIG. 6, showing an arrangement of an electronic control system of the invention, numeral 31 designates an electronic control unit (ECU) made, for example, of a microcomputer or the like. In the ECU 31, a CPU 32, a ROM 33, a RAM 34, a back-up RAM 34, and an I/O interface 36 are connected to each other through a bus line 37, and a constant-voltage regulator 38 supplies a predetermined stabilized voltage to the respective sections.

The regulator 38 is connected directly and through a relay contact of an ECU relay 39 to a battery 40. And, a relay coil of the ECU relay 39 is connected to the battery 40 through an ignition switch 41.

The intake air sensor 8, the throttle sensor 9, the knock sensor 14, the coolant temperature sensor 16, the FO$_2$ sensor 20a, the RO$_2$ sensor 20b, the crank angle sensor 22, the can angle sensor 24 and a vehicle speed sensor 25 are connected to an input port of the I/O interface 36, and the battery 40 is connected to the input port of the I/O interface 36 to monitor a battery voltage.

On the other hand, the ignitor 26 is connected to an output port of the I/O interface 36. Further, the ISCV 11, the injector 12 and an electronic control system (hereinafter abbreviated to as "an ECS") lamp 43 arranged on an instrument panel (not shown) are connected to the output port of the I/O interface 36 through a driver 42.

A control program and fixed data such as various maps are stored in the ROM 33. Data obtained after output signals of the above-described sensors and switches are processed and data calculated by the CPU 32 are stored in the RAM 34. Data indicating a trouble are stored in the back-up RAM 35, and the data are held even when the ignition switch 41 is turned OFF.

The trouble data can be read out externally by connecting a serial monitor 44 to the ECU 31 through a connector 45. The serial monitor 44 was described in detail in Japanese Patent Application Laid-Open 2-73131 filed by the same assignee as that of the present invention, and hence a detailed description thereof will be omitted.

The CPU 32 calculates an engine speed NE based upon a crank angle signal from the crank angle sensor 22, obtains a basic fuel injection quantity TP based upon the engine speed NE and an intake air quantity QA from the intake air sensor 8, corrects the basic fuel injection quantity TP by feeding back an air-fuel ratio based upon outputs from the FO$_2$ sensor 20a and the RO$_2$ sensor 20b, calculates a final fuel injection quantity Ti by correcting to increase it by various operating condition parameters, and calculates an ignition timing of each cylinder of the engine.

Further, the CPU 32 diagnoses a deterioration of a catalyst based on output voltages from both the O$_2$ sensors 20a and 20b when a predetermined diagnosis condition is established, lights or flashes the ECS lamp 43 when the CPU 32 judges a deterioration of the catalyst as a result of the diagnosis, to warn necessity of a replacement of the catalytic converter 19 and stores the trouble data in the back-up RAM 35.

Then, the diagnosis of a deterioration of the catalyst by the ECU 31 will be described by referring to the flowcharts of FIGS. 1 and 2.

Figure 1:
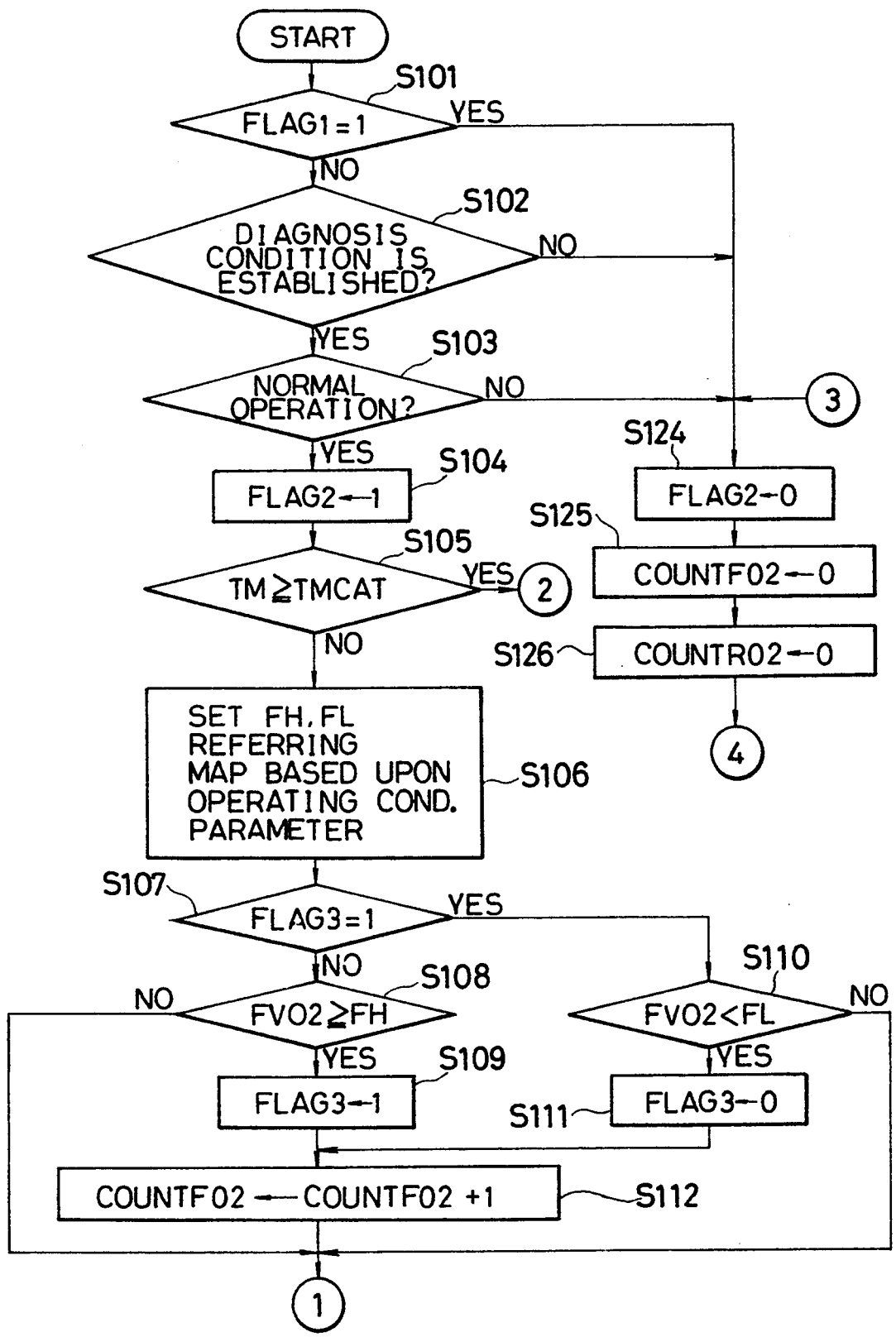
FIG. 1 is a flowchart showing an example of a flow of steps of diagnosing a deterioration of a catalyst according to a device and method for detecting the deterioration of the catalyst of the present invention.

FIG. 1 shows a catalyst deterioration diagnosis routine to be interrupted and executed at each predetermined time (e.g., each 50 msec.) according to the present invention. When the catalyst deterioration diagnosis routine is started after the engine of the vehicle is operated, first in a step S101, whether or not a diagnosis end flag FLAG1 stored in a predetermined address of the RAM 34 is set is judged. Then, in a step S102, whether or not a diagnosis condition for allowing to diagnose a deterioration of the catalyst during an air-fuel ratio feedback control is established is judged. Further, in a step S103, whether or not a normal operation in which a present operating condition is stabilized in such a manner that variable values such as, for example, a basic fuel injection quantity TP, an engine speed NE, a vehicle speed VP fall within respective set ranges, is judged.

In the catalyst deterioration diagnosis routine, in a step S121 to be described in detail later with reference to FIG. 2, a subroutine of judging a deterioration of a catalyst is called to detect the deterioration of the catalyst. After the engine is started, when the subroutine of judging a deterioration of the catalyst is once executed, the above-described diagnosis end flag FLAG1 is set to FLAG1=1, in the step S101, and the flow passes through the routine without diagnosing in this routine.

More specifically, when the catalyst deterioration diagnosis is once executed after the engine is started, the judgement of the deterioration of the catalyst is thereafter not executed. When the engine is again started after a power source for controlling the ECU 31 is turned OFF as the engine is stopped, the diagnosis end flag FLAG1 of the RAM 34 is cleared to FLAG1=0 by means of an initialization at the time of starting, and the catalyst deterioration diagnosis is again executed only once.

In case where the FLAG1=1 is set in the step S101 and the catalyst deterioration diagnosis has already been once executed, or the diagnosis condition is not established in the step S102, or a normal operation state is not judged in the step S103, the flow is jumped from the respective steps S101, S102 and S103 to a step S124.

In the step S124, a diagnosis start flag FLAG2 for counting a time elapsed after the diagnosis is started, is cleared (FLAG2 to "0"). Then, in a step S125, a counted value COUNTFO$_2$ of an FO$_2$ inverting counter for counting the number of times of being cut by the output of the FO$_2$ sensor 20a across the slice level is cleared (COUNTFO$_2$ to "0"). And, then, in a step 126, a counted value COUNTRO$_2$ of an RO$_2$ inverting counter for counting the number of times of being cut by the output of the RO$_2$ sensor 20b across the slice level is cleared (COUNTRO$_2$ to "0"). Thus, the flow passes through the routine.

Figure 4:
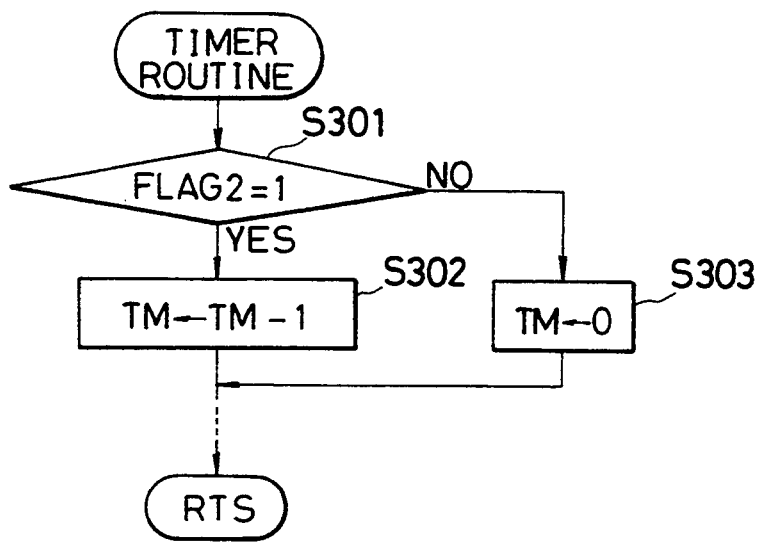
FIG. 4 is a flowchart showing an example of a flow of a timer routine.

The elapsed time after the above-described catalyst deterioration diagnosis is started, is counted by a timer routine to be executed at each predetermined time, as shown in FIG. 4. Referring to FIG. 4, in a step S301, whether or not the value of a diagnosis start flag FLAG2=1 is judged. If FLAG2=1 is established, the flow is advanced to a step S320. Then, a counted value TM of the timer indicating the elapsed time after the catalyst deterioration diagnosis is counted up (TM+1 to TM). On the contrary, if FLAG2=0 is established, the flow is advanced to a step S303, and a counted value TM of the timer is cleared (TM to "0").

On the other hand, referring back to FIG. 1, in the steps S101, FLAG1=0 is established, and the catalyst deterioration diagnosis is not yet executed. Then, in the step S102, the diagnosis condition is established, and in the step S102, when a normal operating condition is judged, the flow is advanced to a step S104. Then, the diagnosis start flag FLAG2=1 is set (FLAG2 to "1"). When the diagnosis start flag FLAG2 is set in the step S104, a lapse time after the diagnosis is started, is counted by the above-described timer routine.

Thereafter, the flow is advanced from the step S104 to a step S105. The counted value TM of the timer is read out, and whether or not the counted value TM of the timer becomes equal to or higher than a set time TMCAT is judged. If TM<TMCAT is satisfied in the step S105, the flow is advanced from the step S105 to a step S106. Then, a process for counting the number of times of being cut by the output voltages FVO$_2$ and RVO$_2$ of the FO$_2$ sensor 20a and the RO$_2$ sensor 20b across the respective slice levels is executed. If TM≧TMCAT is satisfied in the step S105, the flow is branched from the step S105 to a step S120, and a process for judging a deterioration of the catalyst is executed.

More particularly, in the step S106 and the following steps, one set of upper lean/rich slice level FH and lower rich/lean slice level FL are set as first slice levels to an output of the FO$_2$ sensor 20a by referring to a first slice level map stored in the ROM 33 based upon operating condition parameters such as, for example, the vehicle speed VP, the engine speed NE, the basic fuel injection amount TP, an air-fuel ratio correction amount by the RO$_2$ sensor 20b, and a correcting direction of lean/rich side of the air-fuel ratio by the RO$_2$ sensor 20b first in the step S106.

Referring also to FIGS. 7(a) to 7(c), showing the relationship between the output characteristics of the O$_2$ sensors and the slice levels with time elapsed when the catalyst is deteriorated, the lean/rich slice level FH is a reference value for judging that the output voltage FVO$_2$ of the FO$_2$ sensor 20a is varied from the lean side to the rich side (from low to high), and the rich/lean slice level FL is a reference value for judging that the output voltage FVO$_2$ of the FO$_2$ sensor 20a is varied from the rich side to the lean side (from high to low). The lean/rich slice level FH is set to a value higher than the rich/lean slice level FL. A control hunting is prevented by incorporating a hysteresis at the slice levels when the output voltage FVO$_2$ of the FO$_2$ sensor 20a cuts the slice level FH or FL.

The upper and lower slice levels FH and FL are previously obtained by experiments based, for example, on one or two above-described operating condition parameters, and stored in a first slice level map. For instances, the values are so set that an interval between the lean/rich slice level FH and the rich/lean slice level FL is narrowed as the vehicle speed VP or the engine speed NE increases. Though not unitarily defined according to the characteristics of each engine type, the higher the vehicle speed VP or the engine speed NE is, the higher the lower rich/lean slice level FL is set. A set of upper and lower lean/rich slice levels RH and rich/lean slice level RL as second slice levels to the output of the RO$_2$ sensor 20b set in a step S113 to be described in detail later are similarly defined.

Then, the flow is advanced from the step S106 to a step S107. With reference to a value of FO$_2$ rich flag FLAG3 to be set when the output voltage FO$_2$ of the FO$_2$ sensor 20a exceeds the lean/rich slice level FL to the air-fuel ratio rich side, whether or not FLAG3=1 is established, is Judged. In the step S107, if FLAG3=1 is established, the flow is advanced to a step S110. On the contrary, when the FLAG3=0 is established in the step S107, the flow is advanced to a step S108. In the step S108, if the air-fuel ratio is the lean side when the previous routine is executed with FLAG3=0 in the step S107, whether or not the output voltage FVO$_2$ of the FO$_2$ sensor 20a is equal to or higher than the lean/rich slice level FH is judged.

Figure 2:
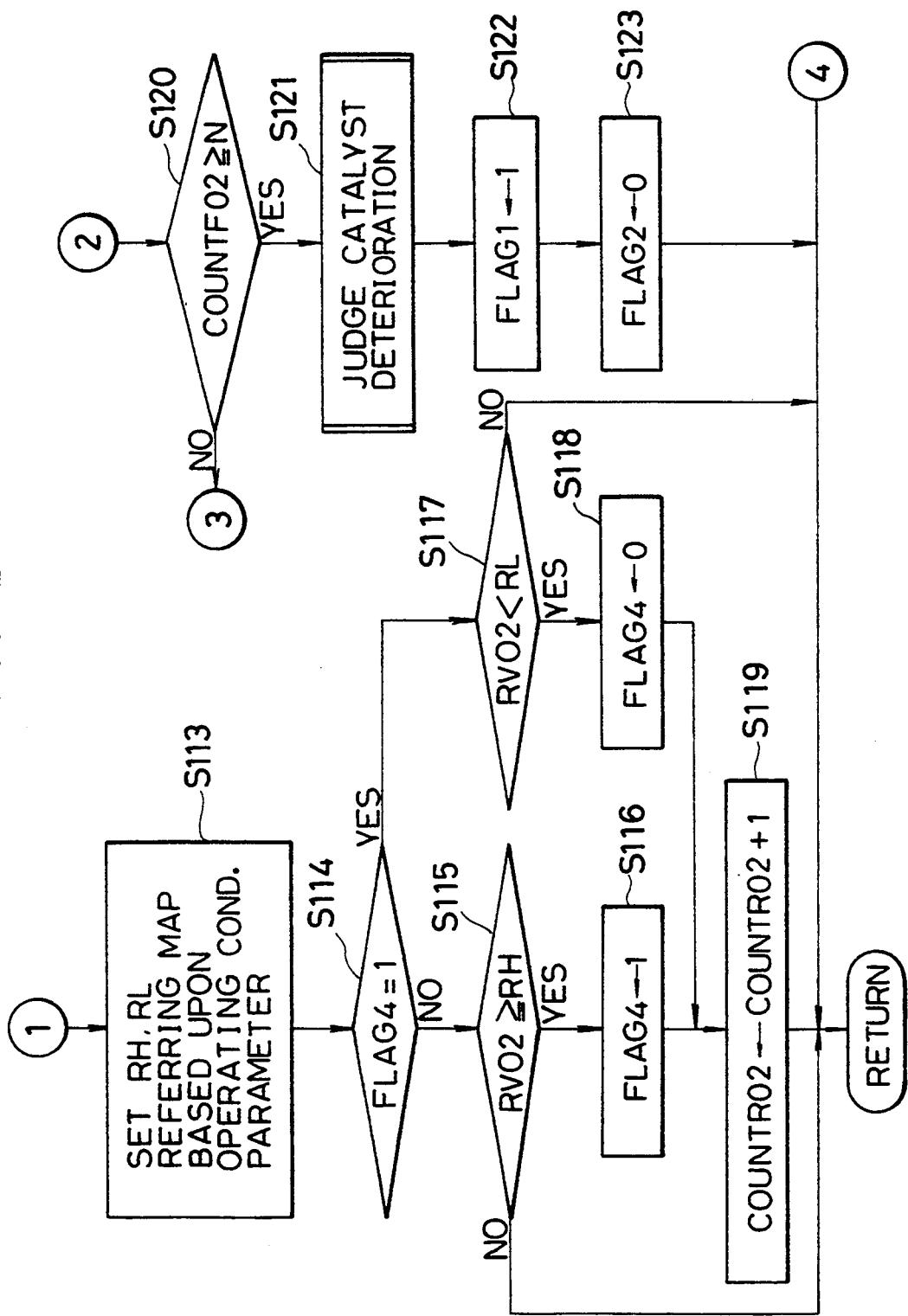
FIG. 2 is a flowchart showing another example of a flow of steps of diagnosing a deterioration of a catalyst according to the present invention.

If FVO$_2$<FH in the step S108, the flow is jumped to a step S113 (see FIG. 2). On the contrary, if FVO$_2$≧FH in the step S108, namely, if it is judged that the output voltage FVO$_2$ of the FO$_2$ sensor 20a is shifted from the lean side to the rich side to cut the lean/rich slice level FH, the flow is advanced to a step S109. In the step S109, the FO$_2$ rich flag FLAG3 is set (FLAG3 to "1"). Then, the flow is advanced to a step S112. In the step S112, the FO$_2$ inverting counter is counted up (COUNTFO$_2$ to COUNTFO$_2$+1). Then, the flow is advanced to a step S113 (FIG. 2).

On the other hand, if FLAG3=1 is established in the step S107 and the air-fuel ratio is the rich side when the previous routine is executed, the flow is branched to a step S110. In the step S110, whether or not the output voltage FVO$_2$ of the FO$_2$ sensor 20a is lower than the rich/lean slice level FL is judged.

When FVO$_2$≧FL is satisfied in the step S110, the flow is jumped to a step S113 (FIG. 2). On the contrary, when FVO$_2$<FL is satisfied and it is judged that the output voltage FVO$_2$ of the FO$_2$ sensor 20a is shifted from the rich side to the lean side to thereby cut the rich/lean slice level FL, the FO$_2$ rich flag FLAG3 is cleared in the step S111 (FLAG3 to "0"). The flow is then advanced to the step S112. In the step S112, the FO$_2$ inverting counter is counted up, and the flow is then advanced to the step S113 (FIG. 2).

Referring to FIG. 2, the process after the step S113 is used for processing the RO$_2$ sensor 20b. In the step S113, referring to a second slice level map stored in the ROM 33, one set of upper and lower lean/rich slice level RH and rich/lean slice level RL are similarly set for the output of the RO$_2$ sensor 20b based upon the operating condition parameters such as, for example, the vehicle speed VP, the engine speed NE, the basic fuel injection quantity TP, the air-fuel ratio correcting amount by the $RO_2$ sensor 20b, a correcting direction of the air-fuel ratio at the rich/lean side by the $RO_2$ sensor 20b and the like.

Then, in a step S114, by referring to a value of $RO_2$ rich flag FLAG4 to be set when the output voltage $RVO_2$ of the $RO_2$ sensor 20b exceeds the lean/rich slice level RH to the air-fuel ratio rich side, if FLAG4=0 and the air-fuel ratio is the lean side when the previous routine is executed, the flow is advanced to a step S115. In the step S115, whether or not the output voltage $RVO_2$ of the $RO_2$ sensor 20b is equal to or higher than the lean/rich slice level RH is judged.

In the step S115, if $RVO_2<RH$, the flow passes through the routine as it is, while if $RVO_2 \geq RH$, it is judged that the output voltage $RO_2$ of the $RO_2$ sensor 20b is shifted from the lean side to the rich side to thereby cut the lean/rich slice level RH, and the flow is advanced to a step S116. In the step S116, when the $RO_2$ rich flag FLAG4 is set (FLAG4 to "1"), the $RO_2$ inverting counter is counted up (COUNTRO2 to COUNTRO2+1) in a step S119, and the flow passes the routine.

On the other hand, if FLAG4=1 in the step S114 and the air-fuel ratio is the rich side when the previous routine is executed, the flow is branched to a step S117, and whether or not the output voltage $RVO_2$ of the $RO_2$ sensor 20b is lower than the rich/lean slice level RL is judged.

If $RVO_2 \geq RL$ in the step S117, the flow passes the routine, while if $RVO_2<RL$ in the step S117, it is judged that the output voltage $RVO_2$ of the $RO_2$ sensor 20b is shifted from the rich side to the lean side to cut the rich/lean slice level RL. Then, the flow is advanced to a step S118. In the step S118, the $RO_2$ rich flag FLAG4 is cleared (FLAG4 to "0"). Then, in the step S119, the $RO_2$ inverting counter is counted up, and the flow passes the routine.

The routine is repeated at each predetermined time, and in the steps S106 to S119 (FIGS. 1 and 2) described above, the number of times of being cut by the output voltages $FVO_2$ and $RVO_2$ of the $FO_2$ sensor 20a and the $RO_2$ sensor 20b across the slice levels is counted. In the step S105, when the counted value TM of the timer then becomes the set time TMCAT or more, the flow is branched from the step S105 to a step S120, and whether or not the counted value COUNTFO2 of the $FO_2$ inverting counter becomes a set number of times N or more is judged.

In the step S120, if $COUNTFO_2<N$, the flow passes the above-described steps S124 to S126 (FIG. 1). After a predetermined time is elapsed, the catalyst deterioration diagnosis routine is again started to the step S120. When $COUNTFO_2 \geq N$ in the step S120, the flow is advanced to a step S121. In the step S121, a subroutine of judging a catalyst deterioration to be described in detail later is called, the catalyst deterioration diagnosis is executed. Then, in a step S122, the diagnosis end flag FLAG1 of the RAM 34 is set (FLAG1 to "1"). Thereafter, in a step S123, the diagnosis start flag FLAG2 is cleared (FLAG2 to "0"), and the flow passes the routine.

More specifically, when the vehicle is traveled at an extremely low speed in which a temperature of exhaust gas is low, even if a sufficiently active catalyst (near to a new catalyst) which is not deteriorated is used, a storage effect is lowered. As a result, an output amplitude of the $RO_2$ sensor 20b is large, it cannot be corrected only by an alteration of the slice level, and there is an apprehension that a deterioration of the catalyst cannot be precisely diagnosed. In addition, in this case, since the output amplitude period of the $O_2$ sensor is long, the deterioration of the catalyst is judged only if the counted value $COUNTFO_2$ of the $FO_2$ inverting counter becomes the set number of times N within the diagnosing time TMCAT thereby preventing a misjudgement of the deterioration.

Figure 3:
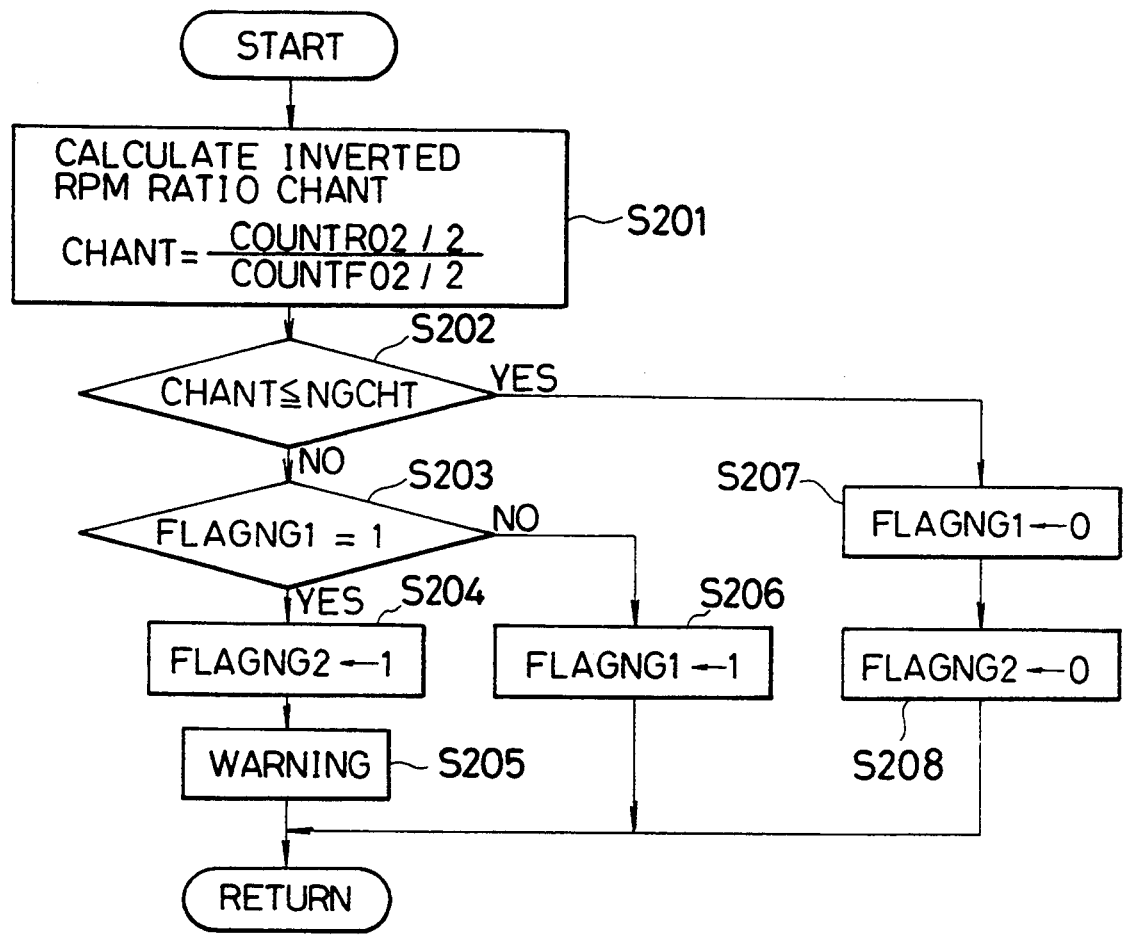
FIG. 3 is a flowchart showing an example of a flow of steps of judging a deterioration of a catalyst according to the present invention.

On the other hand, a subroutine of judging a deterioration of the catalyst in the step S121 is shown in a flowchart of FIG. 3. Referring to FIG. 3, in a step S201 in this subroutine, a ratio of $\frac{1}{2}$ of the counted value $COUNTRO_2$ of the $RO_2$ inverting counter to $\frac{1}{2}$ of the counted value $COUNTFO_2$ of the $FO_2$ inverting counter, namely, a ratio (an inverted rpm ratio) CHANT of the number of times in which the output of the $RO_2$ sensor 20b is inverted at the air-fuel ratio rich-/lean side to the number of times in which the output of the $FO_2$ sensor 20a is inverted at the air-fuel ratio rich-/lean side is calculated (CHANT to ($COUNTRO_2/2$ / ($COUNTFO_2/2$))

Then, the flow is advanced to a step S202. In the step S202, whether or not the inverted rpm ratio CHANT calculated in the step S201 exceeds a set value NGCHT is judged. If CHANT>NGCHT is satisfied, a deterioration of the catalyst is judged. Then, in a step S203, whether or not a first catalyst NG flag FLAGNG1 stored in the back-up RAM 35 is set is checked. If the first catalyst NG flag FLAGNG1 is not yet set and FLAGNG1=0 is established, the flow is advanced to a step S206. In the step S206, the first catalyst NG flag FLAGNG1 is set (FLAGNG1 to "1"), and the flow passes the routine.

If the first catalyst NG flag FLAGNG1 is set when the previous routine is executed and FLAGNG1=1 is set in the step S203, the flow is advanced to a step S204. In the step S204, a second catalyst NG flag FLAGNG2 stored in the back-up RAM 35 is set (FLAGNG2 to "1"), and then the ECS lamp 43 is lit or flashed in a step S205, to produce an alarm of a deterioration of the catalyst, and the flow passes the routine.

More specifically, even if a deterioration of the catalyst is judged as a result when the engine is started and a catalyst deterioration diagnosis is executed, a comparison set value NGCHT to the inverted rpm ratio CHANT is set, for example, to a criterion of exhaust gas emission, and a deterioration of the catalyst cannot be completely judged by the first catalyst deterioration diagnosis. Hence an alarm is not produced, the engine is then stopped, the engine is thereafter again started, and the catalyst deterioration diagnosis is executed. Then, a second catalyst deterioration judgement is executed, namely, when the diagnosis is continuously executed twice to judge a deterioration of the catalyst, the complete deterioration of the catalyst is judged to generate an alarm.

At this time, since the first and second catalyst NG flags FLAGNG1 and FLAGNG2 are set in the back-up RAM 35 and stored as trouble data of the catalyst deterioration, the deterioration of the catalyst can be easily judged by reading out the trouble data stored in the back-up RAM 35 by means of flashing code of the monitor lamp of the ECU 31 or the serial monitor 44. After the catalytic converter 19 is replaced, the trouble data of the back-up RAM 35 is cleared through the serial monitor 44 or the like.

On the other hand, if CHANT≦NGCHT in the step S202, the flow is advanced to a step S208 in FIG. 3. In the step S208, the first catalyst NG flag FLAGNG1 and the second catalyst NG flag FLAGNG2 stored in the back-up RAM 35 are cleared (FLAGNG1 to "0∞, FLAGNG2 to "0"), and the flow passes the routine.

The relationship between the output characteristics of the FO$_2$ sensor 20a and the RO$_2$ sensor 20 at the time of the catalyst deterioration, the output voltage FVO$_2$ of the FO$_2$ sensor 20a and the lean/rich slice level FH, the rich/lean slice level FL, and the relationship between the output voltage of the RO$_2$ sensor 20b and the lean/rich slice level RH, the rich/lean slice level RL are shown in timecharts of FIGS. 7(a), 7(b) and 7(c).

When the catalyst is deteriorated, the output voltage RVO$_2$ of the RO$_2$ sensor 20b is similarly vibrated at a delay to the amplitude of the output voltage FVO$_2$ of the FO$_2$ sensor 20a, and the amplitude of the output voltage RVO$_2$ of the RO$_2$ sensor 20b is relatively large at the time of a normal temperature of exhaust gas (FIG. 7(a)).

As described above, when the slice levels FH, FL, RH, and RL are set in dependency on the operating condition parameters such as the vehicle speed VP, the engine speed NE, etc., the vehicle travels at a low speed or the engine is rotated at a low speed range and exhaust gas temperature is expected in a normal temperature state based upon the operating condition parameters, for example, as shown in FIGS. 7(b) and 7(c), a control hunting when the output voltages FVO$_2$ and RVO$_2$ of the O$_2$ sensors 20a and 20b cut the slice levels FH, FL and RH, RL is effectively prevented by setting an interval between the slice levels FH and FL and an interval between the slice levels RH and RL to a relatively wide value, and hence the amplitudes of the output voltages FVO$_2$ and RVO$_2$ can be reliably cut by the slice level. Thus, the number of times of being cut by the slice levels is accurately counted to appropriately diagnose the deterioration of the catalyst.

On the other hand, in case where a temperature of the exhaust gas is relatively high at the time of deterioration of the catalyst, as shown in FIG. 8(a), the amplitude of the output voltage RVO$_2$ of the RO$_2$ sensor 20b becomes low. Even in this case, as described above, the slice levels FH, FL, RH, RL are set based upon the operating condition parameters. If the vehicle travels at a high speed, the engine is rotated at a high speed range and a temperature of the exhaust gas is expected to be high, as shown in FIGS. 8(b) and 8(c), an interval between the slice levels FH and FL and an interval between the slice levels RH and RL are narrowed, though not unitarily defined according to an engine type, the higher the temperature of the exhaust gas is, the higher the rich/lean slice levels FL and RL are set in the above-described embodiments. Accordingly, even if the amplitude of the output voltage RVO$_2$ of the RO$_2$ sensor 20b becomes low, the amplitude of the output voltage RVO$_2$ of the RO$_2$ sensor 20b can be precisely cut by the slice level, and the diagnosis of the deterioration of the catalyst can be performed without misjudgement of the deterioration.

The output characteristics of the FO$_2$ sensor 20a and the RO$_2$ sensor 20b at the time of normal catalyst is shown in FIG. 9(a), the relationship between the output voltage FVO$_2$ of the FO$_2$ sensor 20a and the slice levels FH, FL is shown in FIG. 9(b), and the relationship between the output voltage RVO$_2$ of the RO$_2$ sensor 20b and the slice levels RH, RL is shown in FIG. 9(c).

When the catalyst is normal, the output voltage RVO$_2$ of the RO$_2$ sensor 20b is not almost fluctuated, the number of times of being cut by the output voltage RVO$_2$ of the RO$_2$ sensor 20b across the slice levels RH, RL is extremely low, and hence the inverted rpm ratio CHANT becomes the set value NGCHT or less, and the catalyst is judged to be normal.

According to the present invention as described above, the first slice levels of the output of the first air-fuel ratio sensor upstream side of the catalytic converter and the second slice levels of the output of the second air-fuel ratio sensor downstream side of the converter are respectively set based on the operating condition parameters of the engine, and the deterioration of the catalyst of the catalytic converter is judged based upon the ratio of the number of times of being cut by the output of the first air-fuel ratio sensor across the first slice levels to that of being cut by the output of the second air-fuel ratio across the second slice levels. Therefore, the influence of the output amplitude fluctuation of the second air-fuel ratio sensor downstream side of the catalytic converter varying according to the operating condition is avoided, and a misjudgement of the deterioration of the catalyst can be prevented.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A device for detecting deterioration of a catalyst mounted on an engine having, a first air-fuel ratio sensor inserted at a front portion of said catalyst in an exhaust pipe for detecting a first air-fuel ratio before exhaust gases enter said catalyst, a second air-fuel ratio sensor inserted at a rear portion of said catalyst in said exhaust pipe for detecting a second air-fuel ratio after said exhaust gases pass through said catalyst, and various sensors for detecting an engine operating condition and for generating an engine operating condition signal, an improvement of the device which comprises:

first setting means responsive to said engine operating condition signal for deciding a first upper and a lower slice level of said first air-fuel ratio sensor in accordance with each engine operating condition and for producing a first number signal of being cut by an output of said first air-fuel ratio sensor;

second setting means responsive to said engine operating condition signal for deciding a second upper and a lower slice level of said second air-fuel ratio sensor in accordance with each engine operating condition and for producing a second number signal of being cut by said output of said second air-fuel ratio sensor; and judging means responsive to said first and second number signals for precisely deciding a deterioration of said catalyst by calculating a ratio between both signals so as to avoid a misjudgment of said deterioration and to eliminate an amplitude output disturbance form said second air-fuel ratio sensor due to a fluctuation of said engine operating condition.

2. A method for detecting deterioration of a catalyst mounted on an engine having, a first air-fuel ratio sensor inserted at a front portion of said catalyst in an exhaust pipe for detecting a first air-fuel ratio before exhaust gases enter said catalyst, a second air-fuel ratio sensor inserted at a rear portion of said catalyst in said exhaust pipe for detecting a second air-fuel ratio after said exhaust gases pass through said catalyst, and various sensors for detecting an engine operating condition and for generating an engine operating condition signal, an improvement of the method which comprises the steps of:

setting a first upper and a lower slice level of said first air-fuel ratio sensor in accordance with each engine operating condition;

producing a first number signal of being cut by an output of said first air-fuel ration sensor;

deciding a second upper and a lower slice level of said second air-fuel ratio sensor in accordance with each engine operating condition;

generating a second number signal of being cut by said output of said second air-fuel ratio sensor; and judging a deterioration of said catalyst by calculating a ratio between said both signals so as to avoid a misjudgement of said deterioration in spite of being effected by an amplitude output disturbance from said second air-fuel ratio sensor within high temperature conditions of the engine.

* * * * *